April 5, 1966   E. REITTER, JR., ETAL   3,243,851
DIE FOR MAKING PLASTIC CONTAINER CLOSURES
Filed Feb. 21, 1964                                2 Sheets-Sheet 1

INVENTORS
ERWIN REITTER, JR.
NATHANIEL C. WYETH

BY

ATTORNEY

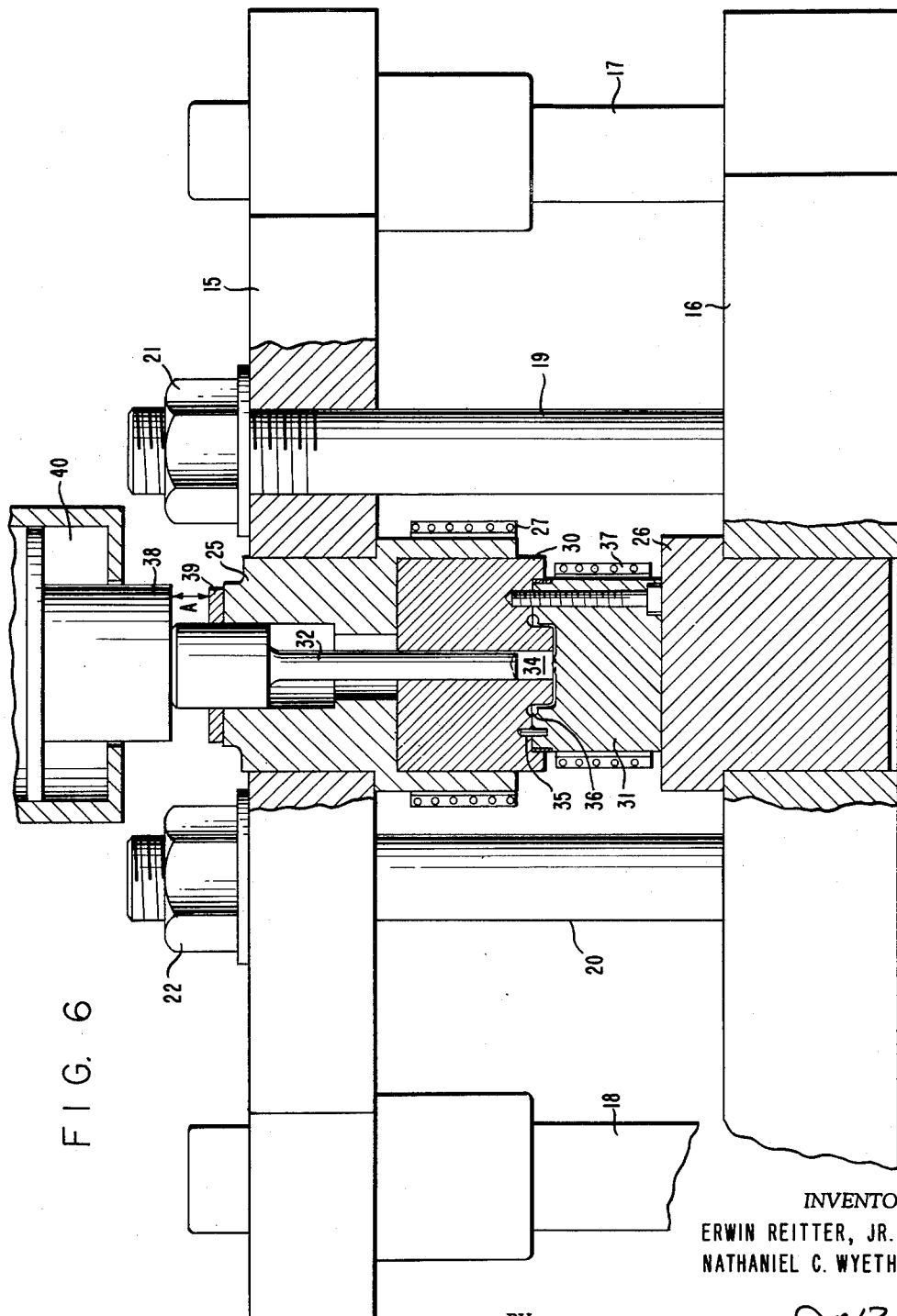

United States Patent Office 3,243,851
Patented Apr. 5, 1966

3,243,851
DIE FOR MAKING PLASTIC CONTAINER
CLOSURES
Erwin Reitter, Jr., 403 Tyrone Ave., Woodcrest, Wilmington, Del., and Nathaniel C. Wyeth, Rosedale, Pa.
Filed Feb. 21, 1964, Ser. No. 346,508
4 Claims. (Cl. 18—42)

This invention relates to molecularly oriented thermoplastic caps for sealing bottles, jars and the like.

There now exists a large market for bottled carbonated beverages, such as beer, soft drinks and the like. The bottles are usually closed with a metal crown consisting essentially of a metal disc with a downturned fluted edge and having a resilient disc in the center thereof to provide a gas-tight seal when the cap is crimped on a bottle. Plastic container closures would offer many advantages over the conventional metal crowns, including the elimination of sharp edges in handling, greater ease of disposal (e.g., by burning), greater freedom of design in decoration, such as embossing and the production of colored and overlay designs, lower shipping costs due to lighter weight, absence of corrosion and absence of flavor contamination.

Plastic closures for containers have been known heretofore but have failed significantly to displace metal crowns as the primary sealing means for beverage bottles. In bottling beer, for example, the beverage is placed in the bottle, capped and then pasteurized. This requires that the caps withstand a pressure of 100 p.s.i. at a temperature of 140° F. In order to withstand such pressures, plastic caps have been made which have a somewhat thick cross section. However, in view of the amount of plastic required and the relatively high cost of molding such closures, they have not been economically competitive with metal closures.

It has now been discovered that lightweight plastic container closures having exceptional strength can be made which comprise a generally axially symmetric membrane of thermoplastic of substantially constant thickness, the molecules of which are aligned and extended preferentially in a circumferential direction about the axis of the membrane and having its edge convolutely rolled to form a toroidal bead having from two to six convolutions.

In a preferred embodiment of this invention, a crown cap is provided suitable for enclosing the contents of beverage bottles in substantially internal pressure, which comprises an axially symmetric cap made of thermoplastic resin, the molecules of which are aligned and extended preferentially about the axis of the cap, the cap consisting substantially of a discoid top having a cylindrical wall depending from the edges thereof and terminating in an outwardly convolutely rolled toroidal bead with two to six convolutions. Preferably, the inner diameter of the cap adjacent to the bead should be from 5% to 15% less than the maximum internal diameter of the cap adjacent to the discoid top.

The caps of this invention are preferably made by a process which comprises the cold extrusion of a substantially cylindrical slub of thermoplastic resin endwise into a die cavity, substantially conforming to the shape of the cap, the diameter of the cylindrical slug being from about 0.2 to 0.7 times the maximum diameter of the cap.

The design of the die necessary to obtain the optimum products of the process of this invention is critical and will be described hereinafter.

The expression "cold extrusion" is employed to signify that the polymer is extruded at a Vicat softening temperature which is defined by the procedure of ASTM Tentative Test Method D1525-58T. Preferably, the extrusion temperature should be from about ambient temperature to about 10 degrees below the Vicat softening temperature and, more preferably, from 50° C. to 10° C. below the Vicat softening temperature.

With regard to the thermoplastic polymers which may be employed in the practices of the invention, any thermoplastic polymer capable of cold extrusion is suitable. Included are condensation and addition polymers, blends, copolymers, including block and graft copolymers, ionic cross-linked polymers and the like. Polymers of the 1-olefins and particularly polymers of ethylene are preferred. Low density polymers of ethylene having a substantial content of short chain branches are well known and are described in value in United States Patent 2,153,-553. The preferred homopolymers of ethylene are high density polymers characterized by a density (after compression molding and cooling in the press at a rate less than 1° C. per minute from a temperature above the crystalline melting point to below 60° C.) of between 0.945 and about 0.960, and by a side chain content measured by infrared spectroscopy of less than one branch per hundred carbon atoms. Methods of making such polymers have been described by Gaylord and Mark "Linear and Steroregular Addition Polymers," Interscience Publishers, Inc., New York, N.Y., 1959. Copolymers of ethylene with higher 1-olefins, such as propylene, butene-1, octene-1, vinyl esters, vinyl ketones, vinyl alkyl ethers, vinyl halides, acryl nitrile, styrene and methyl styrene, alkyl acrylates, alkyl methacrylates and the like, are also useful to make the caps of this invention. The ethylene polymers should be of sufficient molecular weight to be true plastics and, preferably, should have a melt index defined by ASTM Test Procedure D1238-57T of less than 100 and, preferably, from about 15 to 0.01.

Extremely attractive caps can be made from compositions based on copolymers of ethylene and alpha-beta unsaturated acids, such as acrylic acid, the copolymers having an acid comonomer content of from about 5% to about 25% by weight of the copolymer. When such acid copolymers are neutralized with the base, such as an alkali metal hydroxide, or with low molecular weight diamines, extremely attractive compositions result which are readily fabricated by cold extrusion to the bottle caps of this invention. Other attractive compositions include blends of the acid-containing ethylene polymers with polyamides, such as polyhexamethylene adipamide, polyhexamethylene sebacamide, polycaprolactum, polyoxamides and the like. Compositions containing a minor amount of the polyamide with the acid copolymer as the major component may be usefully employed but is preferred to use blends comprising from about 60% to 80% by weight of the polyamide resin, the remainder complementally being the acid-containing ethylene copolymer.

Other suitable plastic compositions which can be fabricated into the caps of this invention are the steroregular crystalline polymers of the 1-olefins, such as isotatic polypropylene, isotatic polybutene-1, isotatic poly-4-methylpentene-1, plasticized polyvinyl chloride, polyvinyldene chloride, polycarbonates and, particularly, the aromatic polycarbonates, polyoxymethylene resins, including polyoxymethylene resins the molecular chains of which are terminated by ester groups, alkyl ether groups or the like and copolymers of formaldehyde trioxane and the like with other copolymerizable monomers. Polyimides, polytetrafluoroethylene, copolymers of tetrafluoroethylene with hexafluoropropylene, acrylonitrile-butadiene copolymers and acrylonitrile-butadiene styrene terpolymers can also be fabricated into the useful bottle caps of this invention by the process described herein. It will also be apparent that other ingredients, such as pigments, antioxidants, ultraviolet screening compounds, lubricants and the like may be incorporated into the plastic compositions prior to the formation into bottle caps.

The invention will be better understood by reference to the accompanying drawings which form a part of this specification. Referring to the drawings—

FIGURE 6 shows a cross sectional view of tooling suitable for making the caps of this invention.

Figure 1:
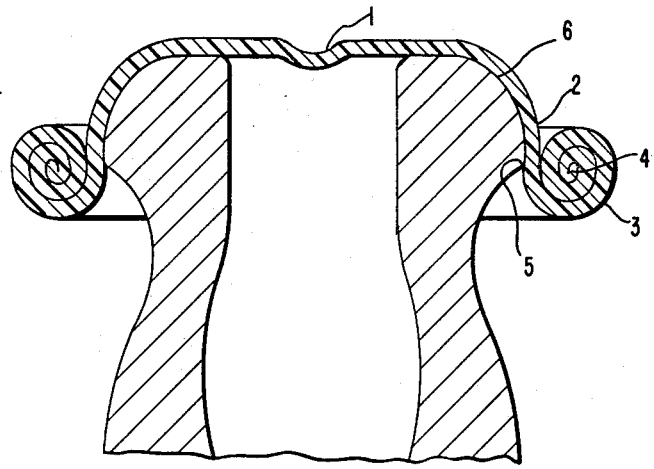
FIGURE 1 shows a crown bottle cap made by the process of this invention in section and placed on the neck of a glass bottle.

Referring now to FIGURE 1, in that figure, the substantially disc shaped top of the crown cap 1 is united with a substantially cylindrical side wall 2 terminated in an outwardly rolled toroidal bead 3 formed by convolution of the sheet-like plastic. The depending cylindrical wall 2 should be of sufficient length to ensure that the cap grips the neck of the bottle tightly. This condition is achieved by making the wall sufficiently long so that, when the cap is placed on a bottle, the center of the toroidal bead 4 is at or below the point of maximum diameter of the neck of the bottle 5. The cap, when thus placed on the bottle, exerts a compressive force inwardly on the bottle neck and a downward pulling action on the cap, stretching it over the top of the bottle so that the seal between the cap and the bottle is effected in the region on the neck of the bottle 6.

Figure 2:
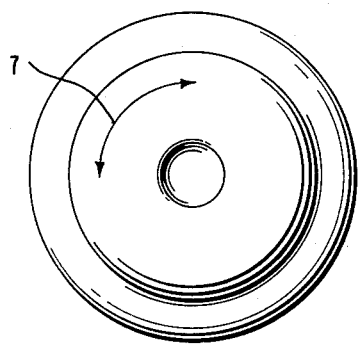
FIGURE 2 shows a plan view of the cap of FIGURE 1.

FIGURE 2 shows a plan view of the cap of FIGURE 1, indicating the axial symmetry which is required by the preferred method of fabrication. Indicated on this figure is an arrow 7 which shows the circumferential direction about which the molecules comprising the thermoplastic material of the cap are extended and aligned.

Figure 3:
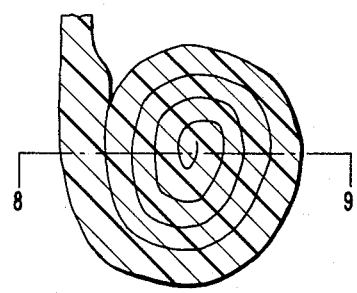
FIGURE 3 shows a cross section of the rolled toroidal bead which forms the edge of the cap.

FIGURE 3 shows an enlarged cross sectional view of a well-formed convolutely rolled toroidal bead. The number of convolutions of the bead may be uniquely defined by drawing a line across the center of the bead to cut the maximum number of edges, counting the number of layers of plastic intersected by the line and dividing by 2. In FIGURE 3 such a line is indicated by 8–9. This line cuts nine layers of plastic and hence number of convolutions illustrated is 4½. The number of convolutions may be varied by varying the size of the toroidal cavity of the die relative to the thickness of the depending wall of the cap. In general, the mean radius of the toroidal cavity should be at least 2½ times the thickness of the die cavity for the depending wall, and may be as much as four times or greater the thickness of the wall cavity. In addition to the size of the toroidal cavity, the number of convolutions is also materially affected by the engineering design of the die cavity and, particularly, by the construction of the entrance of the side wall cavity into the toroidal bead cavity, as will be explained hereinafter.

Figure 4:
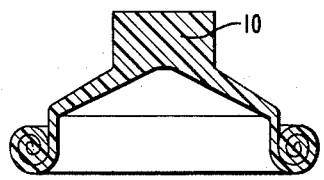
FIGURE 4 shows a cross sectional view of yet another form of cap which may be made by the process of the present invention.

In FIGURE 4 another form of cap is shown which may be readily fabricated by the process of this invention. In this embodiment, an axially symmetric knob or boss 10 which may be used to assist in removal of the cap or for decorative purposes is located in the center of the top. This boss may be formed by use of a slug of plastic of sufficient size and by limiting the stroke of the plunger in the extrusion equipment which will be described hereinafter. The cap of this illustration is intended to be placed over the neck of a bottle in a manner similar to that shown for the cap of FIGURE 1.

Figure 5:
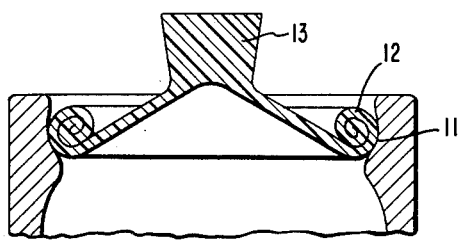
FIGURE 5 shows an embodiment of yet another form of cap which is within the scope of this discovery.

FIGURE 5 shows in section yet another form of cap which may be fabricated according to the process of this invention and which may be employed to seal jars of preserves and the like. In this embodiment the jar is provided with an inner groove 11 in which the toroidal bead 12 is seated. A knob 13 is provided to assist in inserting and removing the cap.

In FIGURE 6 is shown tooling which may be employed to fabricate the caps of this invention. In FIGURE 6 tooling consists of a pair of horizontal beams 15 and 16 which are parallel to each other. Fitted in bored holes in the lower plate 16 are posts 17 and 18 upon which the upper plate is slidably mounted. Also secured to the lower plate 16 is a pair of studs 19 and 20 which are sufficiently long to extend through holes in the upper plate. Each stud 19 and 20 carries a nut 21 and 22 above the upper plate 15. In the center of plates 15 and 16 are coaxially aligned holes in which are situated the tool holders 25 and 26, respectively.

The upper tool holder 25 is provided with a throughgoing bore having regions of different diameters. In the lower part of the tool holder 25 is a large circular cavity adapted to carry the upper part of the die. In close contact with the outer periphery of the upper tool holder 25 is an electrical resistance band heater 27 which surrounds the lower portion of the tool holder 25. The lower tool holder 26 consists of a flange plug seated within the central bore of the plate 16. The dies employed for making crown type closures are fastened to each other and located generally between the holder 25 and 26. The die tools are cmoprised of three major parts, an upper die 30, a lower die 31 and a plunger 32. The upper die 30 is generally cylindrical and is retained in the cavity of the upper tool holder 25. The die 30 has a through-going bore which is partly occupied by the small end of the plunger 32 slidably positioned therein, leaving a cylindrical space 34 within the die at the lower end. The plunger 32 is stepped, its lower end being slidably guided in the die 30 and the upper end, which is of larger diameter, being slidably guided in the upper tool holder 25. The lower die 31 is aligned with the upper die 30 by means of pins 35 which fit closely within corresponding bores in the upper die. The two portions of the die 30 and 31 are complementary to each other and together form a cavity 36 within which a cap (not shown) may be formed. The parting line of the dies 30 and 31 is located substantially at the center of the toroidal bead cavity which forms the outer edge of the die cavity 36. In the central portion of the die cavity, the die 31 is raised to form a slight cone and the end of the plunger 32 forming the third member of the die assembly is machined to form a female cone conforming substantially with the surface of the die block 31. While this feature is not essential, it has been found of material assistance in aiding the flow of plastic into the die cavity from the cavity 34. The lower die 31 is also surrounded by an electrical resistance type band heater 37.

Referring to the upper part of the apparatus, the lower end of the piston rod 38 is shown in abutment with the upper end of the plunger 32. Surrounding a part of the plunger 32 is a collar 39 having a height smaller than the exposed height of the plunger 32 by an amount indicated in the figure by A. Thus, when the piston rod 38 descends, the stroke of the plunger 32 is limited to the distance A at which point the rod 38 will strike the collar 39. Obviously, the height of the collar may be changed to provide different plunger stroke lengths. The piston rod 38 is driven by a conventional hydraulic cylinder 40.

In this embodiment of the invention, an apparatus is shown which is adapted to extrude plastic into the die cavity from the underside of the cap. It will be obvious that the dies may be modified to provide for extrusion of the plastic from the upper side of the cap. Many other modifications of this apparatus will also occur to those skilled in the art. For example, the lower tool holder and die may be supported on a hydraulic cylinder adapted to open the die at the completion of the cap forming process. Likewise, pins to eject the cap from the die may be provided or the cap may be ejected by withdrawal of the plunger 32 followed by admission of compressed air to the space 34. Similarly, automatic means to feed slugs of thermoplastic into the cavity 34 may also be provided.

The caps are manufactured by the following operation: The dies are assembled as shown in the figure and electrical power is applied to each of the heaters 27 and 37 to heat the die assembly to the preselected operating temperature below the melting point of the thermoplastic employed. The temperature of the dies may be controlled by thermocouples inserted into the holes suitably provided in the die assembly which are not shown. In the diagram the dies shown are suitable for making crown type bottle caps to fit a conventional beverage bottle having a nominal neck diameter of about one inch. For this size cap, the volume of plastic required is about 0.06 cubic inch. A precut slug having the calculated volume is inserted into the space 34 by temporary removal of the plunger 32. Hydraulic fluid is then admitted to the upper end of the cylinder 40. A pressure sufficient to place from 5,000 to 100,000 p.s.i. on the plastic slug is applied by the hydraulic cylinder whereupon the plunger descends forcing the plastic into the die, the forming operation being complete in 0.1 to 1.5 seconds. When all the plastic in the slug has been displaced into the die, the rod 38 will be resting on the collar 39 and the lower end of the plunger 32 will be flush with the lower face of the die 30. The slug may be held in the die cavity 34 for a sufficient time to enable the plastic to reach the preselected molding temperature prior to extrusion, but preferably the slug is preheated to the operating temperature prior to its introduction into the cavity 34.

The behavior of the plastic as it enters the die cavity and flows therein is of considerable importance. As the leading edge of the slug is driven out of the space 34, it will be seen that it will strike the die 31 and thereafter flow out into the space 36 in a radial direction filling the die as it advances until it encounters the toroidal cavity. As shown in the figure, one side of the toroidal cavity is tangential to the wall portion of the die. Here the advancing front follows the peripheral surface of the toroid while tending to retain the thickness of the wall portion of the cavity from which it emerged. After passing around the exterior of the cavity, the leading edge eventually meets the surface of the emerging plastic and is bent inwardly and commences to form a convolutely wound bead. The winding continues until the cavity is filled, when the cap is complete, and may be removed immediately from the die.

In general, caps made by this process have very smooth surfaces except for a very slight amount of flash about the plastic in contact with the lower part of the plunger 32 and on the exterior of the bead slight ridges may appear at the parting lines of the die. These slight imperfections in no way impair the utility of the cap and indeed are generally so slight as to require no finishing operation prior to use.

When attempts are made to form convolute beads with simple dies in which the wall cavity extends tangentially into the toroidal bead cavity, it is found that the polymer appears to swell somewhat after emerging from the wall cavity, an effect which is evidently compounded by the increased back pressure as the bead is formed and the cavity filled. In this event, the beads are poorly formed, the convolute layers being of the order of twice the thickness of the wall cavity and the thickness of the thermoplastic layer abruptly changing at the point where the bead joins the walls of the cap. The abrupt change in thickness has proved to be a point of weakness since the caps tend to split or tear at the point of stress concentration created by the step in wall thickness when the cap is forced over a bottle neck.

Figure 7:
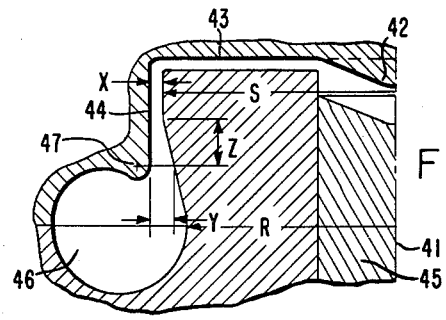
FIGURE 7 shows an enlarged view, in section, of a portion of a die illustrating the features of the die essential to making a well-formed convolute bead.

Surprisingly, it has ben found possible to eliminate the aforesaid undesirable effects by modification of the die cavity. This is shown in the accompanying drawing FIGURE 7 which illustrates a portion of the die cavity in section. In FIGURE 7 the center line of the die assembly is indicated by the dotted line 41. The upper portion of the die commences with a slightly conical surface 42 starting at the center line and then continues in a substantially flat surface 43 to the outer wall of the die 44. The lower part of the die has a central opening about the center line 41 in which is located the plunger 45 corresponding to the plunger 32 of FIGURE 6. The upper surface of this plunger is coned to conform with the cone 42 of the upper die. The dies otherwise form a passageway of substantially uniform thickness which terminates into a toroidal bead cavity 46. The tangential entrance of the wall cavity into the toroidal bead cavity 46 forms a lip 47. It has been found that, by rounding the lip 47 to a radius of from one-tenth to one-third the mean radius of the bead cavity, the production of a sharp step in the wall thickness is eliminated and the caps formed using such dies may be applied to bottles without the substantial number of failures by tearing. It has also been found that, by forming the wall section of the die cavity in the form of a diverging taper at the point of entrance into the toroidal bead cavity, the bead tends to have its layers more uniform in thickness and more evenly rolled. The opening of the wall cavity into the toroidal bead cavity measured at the center of curvature of the lip and indicated on the figure by $Y$ should be from 1.1 to two times the mean wall cavity thickness $X$ and may be as much as three times the wall cavity thickness $X$. The taper preferably should extend about 1.5 to five times the wall thickness along the length measured from the center of curvature of the lip and may extend as much as thirteen times that distance, i.e., the dimension $Z$ shown in FIGURE 7 should be from 1.5 to thirteen times $X$ and preferably from 1.5 to 5$X$. In general, it is preferable to correlate $Y$ and $Z$ to provide an angle of taper in the range between 5 degrees and 15 degrees. In designing crown bottle caps, it is preferable that the internal diameter of the cap at the center of the bead shown in the figure by $R$ should be less than the maximum internal diameter of the cap (i.e., the diameter $S$ adjacent to the discoid top) by an amount between ½% and 2% of the diameter $S$. With such caps the taper may be made conveniently by forming the portion of the die corresponding to the outer wall of the cap in a substantially cylindrical conformation and forming the inner wall of the die to diverge away from the outer wall of the die and unite tangentially to the toroidal bead cavity 46 as shown in FIGURE 7.

Specifications for the neck of glass bottles adapted to be fitted with crown caps have been published by the Glass Container Manufacturers Institute. These specifications provide that the maximum outer diameter of the neck shall be from 1.038 to 1.063 inches with a nominal diameter of 1.050 inches. For the fabrication of plastic crowns suitable for capping such containers, an inner diameter of the cylindrical wall cavity in the die of 0.987 inch and an internal bead diameter of 0.958 inch have been found suitable. The dimensions of the finished cap differ somewhat from those of the die inasmuch as removal of the cap from the die requires some expansion, part of which is elastic. This expansion is offset in part by residual shrinkage of the plastic which occurs even with caps which have been formed close to the melting point of the thermoplastic polymer, then cooled slowly while remaining in the die. Using a high density polymer of ethylene as the cap material, the central opening of the toroidal bead formed with dies having the dimensions described hereinabove is generally between 0.945 and 0.950 inch.

The rolled toroidal bead formed at the outer edge of the cap consists of discrete convolute layers of plastic which may be unwound with some difficulty and which are by no means fused to a solid bead. This feature contributes materially to the success of the caps. The caps may be placed on beverage bottles with a crowning tool consisting of a hollow cylindrical head chamfered to an angle of about 20 degrees to form a generally conical surface, the inner edge of the cylinder being at a somewhat acute angle. The inner diameter of the crowning tool is sufficient to slide freely over the cap when stretched on the bottle neck so that the tool presses on the bead at a point away from the wall of the cap when the cap is in an unstretched condition. The pressure of the crowning heads tends to unroll the bead slightly permitting the cap to stretch readily over the bottle neck.

The caps of this invention should have the molecules of the thermoplastic extended and aligned in a circumferential direction, particularly in the region of the bead, in order to obtain the maximum strength for the minimum amount of plastic. The process of this invention provides for such molecular orientation. This may be understood by considering that, in essence, the process of the invention converts a cylinder of plastic having a small diameter of substantial thickness to a disc having a considerably greater diameter and lesser thickness. Thus, in effect, the process of this invention extends the plastic material in circumferential direction, the extension being greatest at the outer edges of the finished article. It is known that the extension of thermoplastic materials below the crystalline melting point leads to the extension and alignment of the molecules composing the material, in both the amorphous and crystalline regions of the plastic, in the direction of extension. The alignment of molecules in the crystalline regions may be detected by X-ray analytical procedures which are well known to those skilled in the art. The alignment of chains in amorphous regions may be detected by the use of infrared spectrophotometry employing polarized infrared radiation, preferably by comparison with samples of the plastic which have been stretched uniaxially to predetermined degress in tensile testing equipment. The extended condition of the chains is indicated by the microscopic character of the fracture surfaces formed by breaking samples at temperatures below the brittle point of the plastic. Such surfaces exhibit a generally fibrous character, the fibrous structure running preferentially in the prescribed direction of orientation. The presence of extension alignment is also indicated by an enhanced tensile strength which may be two or more times that of the oriented thermoplastic in the direction of orientation.

In the case of the caps made from a high density substantially unbranched polyethylene, the unit crystallographic cells have been found to have orthorhombic symmetry, the C axis corresponding with molecular chain reaction. It was found that, in addition to a high degree of alignment of the molecular axes, i.e., the C axis, with the circumferential direction, the A and B crystal axes were also highly aligned with respect to the axial and radial directions, respectively, i.e., the cap tended to have the structure of a single crystal. Quantitative measurements of pole figures determined from X-ray analysis using a single-crystal orienter showed that in general the chains were aligned with a Gaussian distribution about the preferred circumferential direction, the half width of the distribution of molecular chains in the side wall being less than 45 degrees and generally less than 35 degrees.

It has also been found highly advantageous to cross-link the thermoplastic of the finished caps. Experiments have shown that, while cross-linking does not materially alter the strength of the plastic materials, substantial improvements in creep resistance are obtained so that significantly higher pressures may be contained in bottles by the closures over substantial periods of time.

In the case of polymers of ethylene, cross-linking is most readily effected by irradiation of the caps with high energy electrons, usually from 0.5 to 10 m.e.v. using a Van de Graaff generator. The radiation dosage should be from about 10 to about 40 megarads and preferably from 20 to 30 megarads. Lesser amounts of radiation are ineffective to substantially increase the creep resistance while greater degrees of irradiation than 40 megarads do not further enhance this property.

Polymers of propylene and higher olefins are degraded by irradiation but may be cross-linked by the addition of low molecular weight polyvinyl compounds, such as divinyl benzene, diallyl fumarate, triallyl cyanurate and the like, to the polymer, prior to fabrication, and thereafter irradiating. It is also contemplated to cross-link the slugs by irradiation or by chemical cross-linking prior to cold extrusion by the process of this invention.

The effect of irradiation as illustrated by the following data measured for caps made from a high density polyethylene resin has a density of 0.964 and a melt index of 0.55. This material was extruded into quarter inch rod stock and cut into slugs having a weight of 0.91 to 0.93 gram. Using the apparatus shown in FIGURE 6 and described hereinabove, the slugs were formed into caps at 260° F. to 280° F. The dimensions and weight of the finished crowns were total weight 0.91 to 0.93 gram, inside diameter 0.965 inch, inside diameter of the bead 0.945 inch, bead diameter 0.12 inch, side wall thickness 0.010 inch, top thickness 0.020 to 0.035 inch, crown height 0.350 inch. The crowns were irradiated using a 3 mev. Van de Graaff generator for totals of 10, 20, 30 and 40 passes into the machine. Each pass gave a radiation dosage of approximately one megarad. Sample caps were placed on stainless steel copy of a standard beverage bottleneck using the cylindrical crown tool described hereinabove. The bottle neck was connected to a hydraulic system, the hole being filled with water except for a small air pocket under the cap which was maintained for the purpose of damping sudden surges in pressure from the pumps employed to pressurize the system. Tests were conducted for a number of samples to determine a "time to failure" at 140° F. for 100 p.s.i. internal pressure. Beer pasteurization requires a "time to failure" of about 0.75 hour under these conditions. "Failure" included any malfunction of the cap resulting in a decrease in pressure. Without irradiation, the "time to failure" was about 0.1 hour; with ten passes of irradiation, the "time to failure" was increased to a value of from 0.17 to 0.5 hour; for twenty passes of irradiation, from 0.3 to 10.5 hours; for thirty passes of irradiation, from 2 to 18 hours; and for forty passes of irradiation, the "time to failure" was increased to a value of from 3 to 23 hours.

Tensile strength (based on original dimensions) was measured on samples cut from the side wall of the caps. For the irradiated material, the tensile strength was 13,000 p.s.i. in the circumference direction and 5,300 p.s.i. in the axial direction. Substantially the same tensile strengths were found for unirradiated caps made by the same process. The tensile strength of an unoriented, molded test sample was 4,000 p.s.i.

Many modifications of this invention will be apparent to those skilled in the art. Thus, decorative features and functional modifications may be made to the caps of this invention by suitable modification to the forming dies. These include castellations, lands, fluting and ridges on the exterior surface of the cap. In the case of crown bottle caps which form an important and preferred embodiment of this invention, a series of spaced lands or mesas on the top of the cap are particularly desirable. In addition to providing an attractive decorative effect, they protect the remainder of the cap from abrasion. Thin metallic foil liners may also be employed for decorative effect and also greatly reduce the permeability of the thermoplastic to gases such as carbon dioxide. The invention has moreover been described in connection with generally circular caps but it will be realized that shapes such as ovals and even square caps can be made by appropriate modification of the die geometry and the slug across section.

We claim:

1. In a die for the manufacture of plastic container closures by cold extrusion comprising an axially symmetric wall cavity defining a membrane, said cavity being connected substantially tangentially at the outer edge with a toroidal cavity adapted to produce a rolled rim on the said closure, the improvement which comprises rounding the lip formed by the junction of the said wall cavity and the said toroidal cavity to a radius of from $\frac{1}{10}$ to $\frac{1}{3}$ the mean radius of the said toroidal cavity.

2. In a die for the manufacture of plastic container closures by cold extrusion comprising an axially symmetric wall cavity defining a membrane, said cavity being connected substantially tangentially at the outer edge with a toroidal cavity adapted to produce a rolled rim on the said closure, the improvement which comprises rounding the lip formed by the junction of the said wall cavity and the said toroidal cavity to a radius of from $\frac{1}{10}$ to $\frac{1}{3}$ the mean radius of the said toroidal cavity and tapering the said wall cavity to a width, at the entrance of the said toroidal cavity adjacent to the radius of curvature of the said lip, of from 1.1 to 3 times the thickness of the wall cavity, over a length of from 1.5 to 13 times the width of the wall cavity.

3. In a die for the manufacture of plastic container closures by cold extrusion comprising an axially symmetric wall cavity defining a membrane, said cavity being connected substantially tangentially at the outer edge with a toroidal cavity adapted to produce a rolled rim on the said closure, the improvement which comprises rounding the lip formed by the junction of the said wall cavity and the said toroidal cavity to a radius of from $\frac{1}{10}$ to $\frac{1}{3}$ the mean radius of the said toroidal cavity and tapering the said wall cavity to a width, at the entrance to the said toroidal cavity adjacent to the radius of curvature of the said lip, of from 1.1 to 2 times the thickness of the wall cavity, over a length of from 1.5 to 5 times the width of the wall cavity.

4. In a die for the manufacture of thermoplastic crown closures for beverage bottles comprising a cup-shaped wall cavity substantially defining the crown closure, and terminating at its edge in a toroidal cavity adapted to form a rolled edge, the improvement which comprises rounding the lip between the outer face of the said wall cavity and the said toroidal cavity to a radius of from $\frac{1}{10}$ to $\frac{1}{3}$ the mean diameter of the said toroidal cavity, and chamfering the region between the inner face of the wall cavity and the said toroidal cavity to a conical surface tangential to the said toroidal cavity, said conical surface extending to a line in the inner face of the said wall cavity 1.5 to 5 times the wall cavity thickness above the radius of curvature of the said lip.

References Cited by the Examiner

UNITED STATES PATENTS

| | | | |
|---|---|---|---|
| 1,792,593 | 2/1931 | Lippold | 18—30 XR |
| 2,239,338 | 4/1941 | Morelli. | |
| 2,272,920 | 2/1942 | Merta. | |
| 2,277,599 | 3/1942 | McGinnis | 18—42 |
| 2,877,497 | 3/1959 | Mercier | 18—42 |

WILLIAM J. STEPHENSON, *Primary Examiner.*